Jan. 23, 1968     R. F. URBANIC     3,364,544
CUT-OFF TOOL AND CHIP REFORMING BREAKER
Filed March 13, 1967
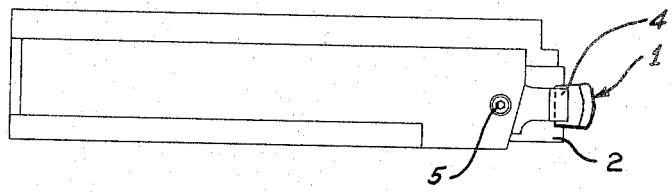
Fig. 1.
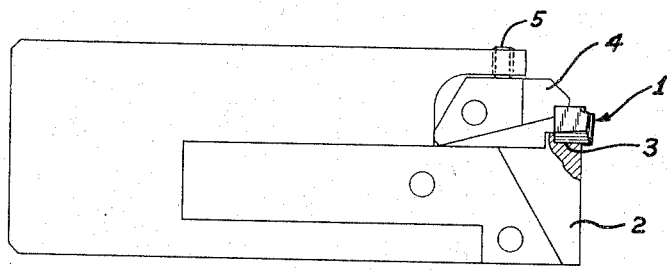 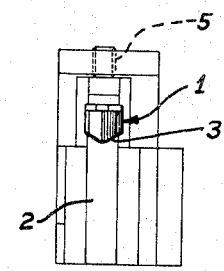
Fig. 2.     Fig. 3.
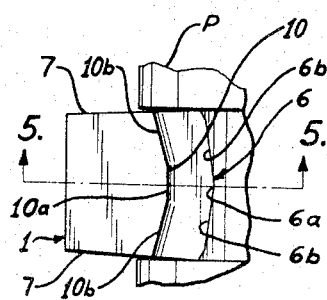 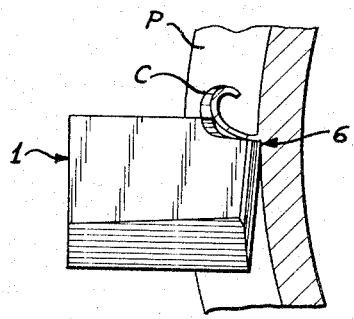 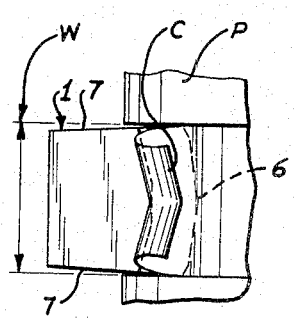
Fig. 4.     Fig. 5.     Fig. 6.
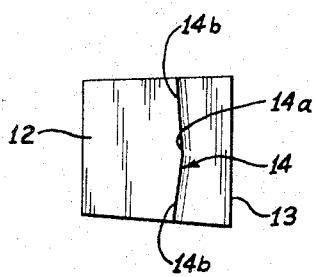
Fig. 7.
INVENTOR.
Robert F. Urbanic,
BY John H. Leonard
his ATTORNEY.

3,364,544
CUT-OFF TOOL AND CHIP REFORMING
BREAKER
Robert F. Urbanic, Willowick, Ohio, assignor to The Pipe Machinery Company, Willowick, Ohio, a corporation of Ohio
Filed Mar. 13, 1967, Ser. No. 622,820
4 Claims. (Cl. 29—96)

ABSTRACT OF THE DISCLOSURE

The present invention is directed to a cutting tool insert and holder. The insert has a cutting edge at the forward end of one face and a chip reformer on the same face. The reformer has a reforming face facing forwardly toward, and spaced rearwardly from, the cutting edge throughout the entire width of the insert. The lateral faces converge rearwardly of the insert. The reforming face has a forwardmost central portion and the remaining portions slope rearwardly from the central portion outwardly laterally of the insert at equal angles to the length of the insert. The insert is held in a holder by a rocking clamp member which is rocked into clamping position relative to the insert by a rotatable settable member. The insert has a longitudinal base portion of outwardly convex V-shape cross section which seats in a complementary V-shape groove in the holder. The settable member holds the insert on the holder with the V-shape portion of the insert seated in the complementary V-shaped groove in the holder.

---

This invention relates to a cutting tool and chip reforming breaker, and particularly to a cutting tool and breaker for cutting circumferential grooves in lengths of pipe or bar stock, either for providing circumferential grooves in the finished product or for cutting the pipes or bar stock into selected lengths.

For purposes of illustration, the invention is described herein as applied to cutting of lengths of pipe, its use for other purposes being apparent from the illustrative example.

Heretofore in thus cutting off lengths of pipe, the practice has been to drive the cutting edge of the tool almost radially of the pipe into the pipe wall. Generally the cutting edge is straight and extends parallel to the stock axis, or, in the so-called spade type of tool, the cutting edge is peaked at its central portion and recedes in both directions away from the ends of the central portion rearwardly and outwardly toward the lateral edges of the tool.

One of the principal problems presented in such grooving and cutting operations, particularly at high speeds, is due to the fact that as the chips are produced, the relief of internal stresses in the chip metal as it is freed from the parent body and the heat generated by the cutting causes the chips to expand endwise of the cutting edge or laterally of the groove being cut. Thus the chips, promptly as formed and while in the groove become greater in overall width than the width of the groove. As a result, they bind and pack in the groove so tightly that they cannot be dislodged readily by the coolant fluid, even under relatively high pressures. If the chips are not removed promptly, the packing increases and builds up even more frictional heat rapidly, both aggravating the heating and causing rapid deterioration of the cutting edge. Often it is necessary to interrupt the cutting operation, back the tool off, remove the packed chips, and then resume the cutting operation.

The present invention is directed to a combination of a cutting tool and chip reforming breaker which, during the formation of a chip, engage the chip as it is cut, near to, or at, its lateral mid-portion and retard travel at the mid-portion so that the portions at the ends of the mid-portion swing rearwardly away from the pipe relative to the mid-portion. This movement imparts to the chip V-like cross sections of which the vertex of the V faces toward the pipe or base of the groove being cut, and thereby reduces the overall width of the chip to less than the overall width of the groove. The chips, being thus reduced in width, are readily removed from the groove by the action of the tool and the conventional introduction of coolants without binding against the side walls of the notch or groove.

The manner in which this is accomplished is readily apparent from the following description wherein reference is made to the drawings in which:

FIG. 1 is a top plan view of a cut-off tool and chip reforming breaker embodying the principles of the present invention, and supported in a conventional tool support for cutting off lengths of pipe;

FIG. 2 is a front elevation, partly in section, of the structure illustrated in FIG. 1;

FIG. 3 is a right end elevation of the structure illustrated in FIGS. 1 and 2;

FIG. 4 is an enlarged top plan view of the cut-off tool and chip reforming breaker and showing the same in relation to the groove being cut in a pipe;

FIG. 5 is a vertical sectional view taken on the line 5—5 in FIG. 4;

FIG. 6 is a top plan view of the chip, tool, and breaker shown in FIG. 4 and indicating diagrammatically the reformed condition of the chip and its relation to the groove;

FIG. 7 is a top plan view of a modified form of the tool and chip reforming breaker employing a linear and straight cutting edge.

For the purposes of illustration, the cut-off tool and chip reforming breaker are shown herein embodied in an insert of which they are integral parts, though the tool and breaker may be separately made and clamped together in a manner common with thread chasers and associated breakers. The insert is mounted on a suitable tool support suitable for cutting off lengths of pipe wherein the tool need project only a certain distance forwardly from the support in a direction toward the pipe.

It is to be understood, however, that an elongated tool support which is narrower in the direction of the width of the groove than the tool insert, may be used if it is desired to cut grooves of substantial depth in bar stock or cut off lengths of bar stock in which a greater distance of tool penetration is required.

Referring, therefore, to the illustrative example, the tool insert, indicated generally at 1, is mounted in a tool supporting block 2 which is adapted for cooperation with a cutting machine in a conventional manner. The tool supporting block is one which is conventional in the trade, and includes an insert support 2 having at its outer end an insert rest 3. The rest 3 has an insert supporting face which faces upwardly and is of V-shape cross section. A suitable adjustable clamp 4 is carried by the block 2 and is arranged to be swung downwardly into clamping engagement with the upper surface of the tool insert 1 and secured in firm clamping relation therewith by a suitable set screw 5.

The cut-off tool shown in FIGS. 1 through 6 for purposes of illustration, has a spade shaped cutting edge 6 which has a central or mid-portion 6a which may be a sharp peak or curvilinear and of substantial extent endwise of the edge. The cutting edge 6 has lateral portions 6b which recede from the opposite ends of the mid-portion 6a outwardly and rearwardly from the mid-portion in a direction away from the stock to be grooved.

The insert has lateral walls 7 which are relatively convergent in a direction rearwardly away from the cutting edge 6 so as to provide the desired operating clearance between the insert and the side walls of the groove being cut.

The front of the insert has a suitable clearance angle of, for example, five degrees, so as not to interfere in any manner with the cutting operation.

The bottom wall of the insert is V-shaped in cross section to provide walls which fit the upwardly facing supporting wall of the rest 3 and prevent lateral displacement of the insert 1.

The structure thus far described is conventional and well known in the art. As illustrated in FIGS. 4 through 6, a pipe P to be cut off by cutting a circumferential groove having a width indicated at W is illustrated. The width of the groove necessarily equals the overall width of the cutting edge 6. During the cutting operation the cutting edge 6 thus forms a chip, indicated at C, and tends to roll it up so that it becomes recurvant forwardly and often takes a spiral or cylindrical form. These chips, however, due to the relief of internal stresses and the heat generated during cutting expand in a direction transversely of the groove so that their overall lengths are greater than the width W of the groove being cut. Thus, they tend to pack and bind in the groove.

In order to eliminate this condition, a chip breaker in the form of a shoulder or breaking face 10 is provided in rearwardly spaced relation from the cutting edge 6. This breaker face 10, however, instead of extending straight or lineally across the insert, has a certain or mid-portion 10a and lateral portions 10b extending from the opposite ends of the mid-portion. The mid-portion 10a may be in the form of a relatively sharp peak or a relatively blunted rounded peak facing directly toward the oncoming chip. The portions 10b recede from the ends of the mid-portion in a direction rearwardly from the cutting edge and outwardly laterally of the insert. The angles of recession of the portions 10b are greater than the angles of recession of the aligned portions 6b, respectively, of the cutting edge so that the rearwardly moving chips first strike or engage the peak 10a of the breaker. Due to the forces moving the on-coming chips, they bend about their portion engaged by the portion 10a, and swing toward the portions 10b. This bending may cause a fracture of the chips near their mid-portions, or may merely result in bending them, but in either event each chip so engaged by the breaker is thus reduced in overall dimension laterally, from one of its edges to the other so that the resultant chip is less than the width W of the groove. At this point the chip is being washed with coolant by which is cooled to a reduced temperature. It retains its bent or set condition or breaks even further under the pressure of oncoming chips and coolant and is readily removed from the groove by the coolant. This not only reduces the power required for removing the chips, but reduces heat due to frictional engagement of the chip with the side walls of the groove, permits better coolant action, and reduces the heating of the tool itself, thus prolonging its life. By means of this simple change in the relation of the chip breaking face to the cutting edge, the chips are reformed immediately after cutting, removed so freely from the groove that packing and jamming thereof requiring temporary withdrawal of the tool and removal of chips are eliminated.

The forwardly facing chip breaking and reforming face 10 is of course spaced an appreciable distance rearwardly from the cutting edge 6. It is substantially coextensive in width with the convergent side walls of the insert or cutting tool at the location rearwardly of the cutting edge, so as not to interfere with the operating clearance of the insert and groove side walls.

The two lateral portions 10b with a breaking face 10 at opposite sides of the mid-portion 10a preferably are disposed symmetrically relative to the mid-portion.

Referring to FIG. 7, a modified form of a cutting tool and chip reforming breaker are illustrated. In this form, the tool and breaker are integral parts of an insert 12.

The cutting edge 13 of the tool is straight and linear instead of being of the spade type having a central peak with portions of the cutting edge receding therefrom in a direction away from the stock. The breaker face, indicated at 14, has a central portion 14a which is relatively more sharply peaked than in the case of the breaker face 10 heretofore described, with the lateral portions of the face 14b receding lineally from the central portion 14a.

The specific shapes of the cutting edge and associated breaker face is not so important as is the fact that the angle of recession of the receding portions of the breaker face from a line extending at a right angle to the side walls of the groove are greater than the angles of the aligned portions of the cutting edge with the same line. Thus, in FIG. 7, since the cutting edge is straight, the portions of the cutting edge at each side of its mid-portion are at an angle of 0° with respect to such a line, and the portions 14b of the breaker face are angles of more than 0° to the same line.

The present cutting tool and chip reforming breaker combination greatly reduce the problem of packing and jamming of chips in the grooves being cut, and the healing and dulling of the tool caused thereby.

It is important that the end sought is accomplished, as disclosed herein, by a tool and breaker insert which can be manufactured at a price which makes the insert a disposable item which can be thrown away and replaced economically with a new duplicate one upon becoming dull.

Having thus described my invention, I claim:

1. A cutting tool and chip reformer combination for grooving or cutting of part of a workpiece and comprising
    a detachable cutting insert adapted for detachable clamping in a holder and having a forwardly exposed cutting edge at its forward end, and having lateral edges converging from adjacent the cutting edge rearwardly of the insert for lateral relief;
    a chip reformer integral with the insert and having at one face of the insert a forwardly facing chip engaging and reforming face extending in the direction of its length for the entire width of the insert and spaced a substantial distance rearwardly from the cutting edge for the entire width of the insert, and facing generally forwardly of the insert;
    said reforming face having a forwardmost portion between and spaced from the ends of the face, and remaining portions sloping rearwardly and outwardly laterally of the insert from the ends of said forwardmost portion toward the ends of the reforming face, and each of said remaining reforming face portions being at an angle to the length of the insert less than the angle to the length of the insert of the portion of the cutting edge aligned forwardly of the insert with such reforming face portion.

2. The structure according to claim 1 wherein the cutting edge has a forwardmost portion, and portions of the cutting edge at opposite sides of the forwardmost portion slope rearwardly, outwardly laterally of the insert, at equal and opposite angles of inclination to the length of the insert, portions of the reforming face at opposite sides of its forwardmost portion slope rearwardly, outwardly laterally of the insert, at equal and opposite angles of inclination to the length of the insert, and
    the angles of inclination of the reforming face portions, relative to the length of the insert are less than the corresponding angles of the portions of the cutting edge aligned with the face portions, respectively.

3. The structure according to claim 1 wherein a holder having a forward end portion is provided and carries a support on said forward end portion;
    the insert is supported on, and projects forwardly from, the forward end portion of said support;
    said support has a V-shaped groove therein with its length extending forwardly and rearwardly of the forward end portion with the open side of the groove facing toward the insert;

the insert has a face of V-shaped cross section which faces oppositely from said one face of the insert and extends forwardly and rearwardly of the insert, and which is complementary to, and seated in, the groove;

said insert is wider than the support;

a clamp member is mounted on the holder for rocking about an axis extending transversely of the support and has an end portion which, in one rocked position of the member, is in engagement with the insert and clamps it in operative position on said support; and rotatable means are connected to the clamp member and to the holder and are operable to rock the clamp member from a released position to a clamping position relative to the insert upon predetermined rotation of the rotatable means, and to retain the clamp member in said clamping position.

4. A cutting tool insert and holder comprising:

an insert having a cutting edge at one end of one face;

a holder having a supporting portion on its forward end;

said insert being supported on said supporting portion and projecting forwardly from the forward end thereof;

said supporting portion having a V-shape groove therein with its length extending forwardly and rearwardly of the holder and with the open side of the groove facing toward the insert;

the insert having a forwardly and rearwardly extending face of V-shape cross section facing oppositely from said one face of the insert, and which is complementary to, and seated in, the groove;

said insert being wider than the support;

a clamp member mounted on the holder for rocking about an axis extending transversely of the support and insert, and having an end portion which, in one rocked position of the member, is in clamping engagement with the insert and clamps it in operative position on said support; and rotatable means connected to the clamp and to the holder and are operable to rock the clamp member from a released position to a clamping position relative to the insert upon predetermined rotation of the rotatable means, and to retain the clamp member in said clamping position.

References Cited

UNITED STATES PATENTS

| | | | |
|---|---|---|---|
| 943,953 | 12/1909 | Neill | 29—95 X |
| 2,713,714 | 7/1955 | Krause | 29—95 |

FOREIGN PATENTS

| | | |
|---|---|---|
| 1,070,898 | 12/1959 | Germany. |
| 39,890 | 4/1957 | Poland. |
| 145,704 | 6/1954 | Sweden. |
| 207,564 | 2/1940 | Switzerland. |

HARRISON L. HINSON, *Primary Examiner.*